United States Patent [19]

Deacon

[11] 4,424,721
[45] Jan. 10, 1984

[54] ADJUSTABLE STEERING COLUMN

[75] Inventor: David W. Deacon, Newark, Calif.

[73] Assignee: Paccar Inc., Bellevue, Wash.

[21] Appl. No.: 258,934

[22] Filed: Apr. 30, 1981

[51] Int. Cl.³ .................... B62D 1/18; G05G 5/24; F16C 17/00
[52] U.S. Cl. .................... 74/493; 74/527; 74/540; 308/3 R; 403/108; 403/323; 403/330
[58] Field of Search .................... 74/493, 527, 540; 403/108, 109, 323, 330; 280/775; 308/3 R

[56] References Cited

U.S. PATENT DOCUMENTS

| | | | |
|---|---|---|---|
| 1,225,289 | 5/1917 | Twombly | 74/493 |
| 1,367,695 | 2/1921 | Gray | 74/493 |
| 2,409,656 | 10/1946 | Austin | 74/527 X |
| 2,744,419 | 5/1956 | Chayne | 74/493 |
| 2,910,887 | 11/1959 | Helms | 74/493 |
| 3,360,306 | 12/1967 | Vargady | 308/3 R |
| 3,533,302 | 10/1970 | Hansen | 74/493 |
| 3,678,778 | 7/1972 | Groves | 74/493 |
| 3,714,843 | 2/1973 | Bracey | 74/527 |

FOREIGN PATENT DOCUMENTS 1925642 11/1970 Fed. Rep. of Germany ........ 74/493

*Primary Examiner*—Allan D. Herrmann
*Attorney, Agent, or Firm*—Owen, Wickersham & Erickson

[57] ABSTRACT

An adjustable steering column includes both tilting and telescoping movement. For telescoping, the steering column and to a telescope latch device which selectively engages one of a series of telescope detents. The tilt adjustment includes a slide component pivotally connected to the steering column and movable with respect to fixed vehicle structure, there being a series of detents in an edge of the slide component. Two or more separate and individually movable latches are provided on a pivotal actuating rod adjacent to the detents of the slide component. The spacing between adjacent latches is different from that between adjacent detents, so that only one latch is engaged in a detent at any one time. All latches are retracted by pivotal retracting movement of the actuating rod, and when the tilt is adjusted, a different latch engages in a detent before the just-disengaged latch reaches the next detent in the direction of movement. This enables fine adjustment of steering wheel tilt positions without close spacing of the detents which would result in a lack of strength of locking positions in the slide member.

10 Claims, 9 Drawing Figures

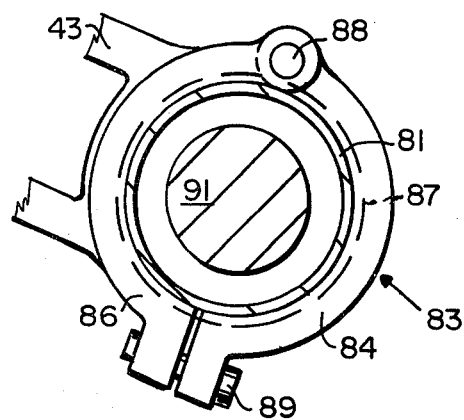
FIG. 9
FIG. 7
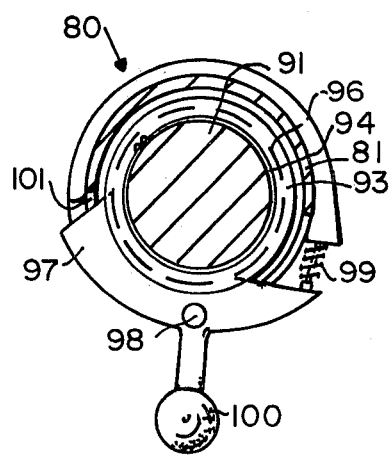
FIG. 8
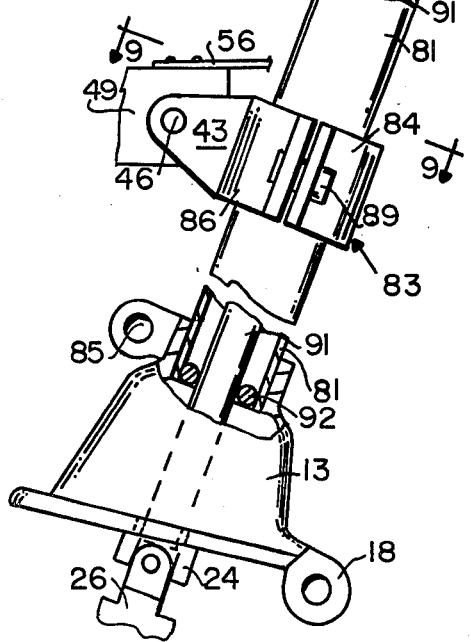

ADJUSTABLE STEERING COLUMN

BACKGROUND OF THE INVENTION

The invention relates to adjustable steering columns for vehicles, and more particularly to a steering column with mechanism which enables both tilt adjustment and telescoping length adjustment.

Numerous types of adjustable steering mechanisms have been suggested and used previously. There have been many that have provided for both tilt adjustment and telescoping adjustment; others have encompassed tilt alone, or telescoping alone.

Examples of previous suggested systems providing both tilt and telescoping in a steering column are U.S. Pat. Nos. 1,367,695, 2,910,887, 3,267,766, 3,302,478 and 4,179,137. Steering columns which tilt but do not adjust in length are shown in U.S. Pat. Nos. 3,533,302, 3,555,924, 3,718,053 and 3,807,252, 4,217,792 and 4,244,237. The following patents show length adjustment, without tilt adjustment: U.S. Pat. Nos. 1,158,202, 2,075,110, 3,306,127, 3,791,223 and 3,955,439. One problem to which the present invention is directed is the provision of a tilt mechanism with a locking adjustment arrangement including a latch with engages in selected detents, but with the ability to achieve relatively fine adjustments in the tilt. Previously this was a problem, particularly when the tilt locking or latching mechanism was at a relatively low position on the steering column. In this situation, a relatively small tilt adjustment at the steering wheel is necessarily accompanied by an even smaller movement at the latching mechanism, and if detents are very closely spaced to allow for this, there tends not to be enough material left between the detents to provide adequate strength in the latching mechanism.

One patent directed to this problem was Glover et al. U.S. Pat. No. 3,267,766, cited above. The solution suggested by the Glover et al. patent was a series of movable, shiftable rollers to provide the detents. A latch was to engage between adjacent rollers, spreading them somewhat to form a detent. When the position of the latch was moved, increments of one roller thickness were available as closely spaced detent positions, thereby providing one movable detent with no fixed structure to separate detents.

The present invention described below is directed to a different, and more rigid latching assembly, without the requirement of close spacing of the detents.

Hansen U.S. Pat. No. 3,533,302, also cited above, shows a tilt steering assembly having some similarities to the mechanism of the present invention. However, Hansen does not show the latching mechanism of the present invention, nor the advantageous slide and guiding hardware for movement of the tilt latch system which forms a part of the present invention.

SUMMARY OF THE INVENTION

The tiltable and length-adjustable steering column of the present invention combines several unique features in a way that produces a more efficient assembly capable of tilt adjustment and length adjustment, without sacrificing strength or rigidity.

Fine adjustment of the tilt angle is achieved, even though the latching mechanism is at a relatively low position on the bottom-pivoted column, through a unique latching system which includes a series of relatively widely spaced detents and a latch device including at least two separately movable, separately engageable latches which are spaced apart by a spacing different from the spacing between adjacent detents. Therefore, only one latch engages a detent at any one time, and a series of closely-spaced tilt positions are possible without closely spaced detents. The separately movable and spring-biased latches are mounted on a single pivotal actuator rod which is effective to retract all latches when pivoted by a handle at the driver's end.

The latching mechanism includes a special slide assembly including an inner slide and an outer slide, with low-friction guide means between them for linear movement of the inner slide within the outer slide. The steering column is attached to the inner slide, which includes the detents, and the latch actuator rod may be mounted on the fixed outer slide.

The length adjustment mechanism for the steering assembly of the invention is connected to the steering mechanism of the vehicle through a jointed conventionally splined intermediate shaft below the column, but with some important features not typical of the prior art. Some of these features are cooperative with the tilt adjustment mechanism. For example, in one embodiment where the base of the column is pivoted from the floor of the vehicle, an outer column of the column assembly extends up only to the point of attachment with the pivot latching mechanism, i.e. the inner slide. Out of the top of the outer column extends the inner column, which extends up to the steering wheel and contains a steering shaft fixed to the steering wheel. A column head secured to the outer column supports a latch handle and latch positioned to engage with any of a series of detents on the inner steering column, the latch being urged toward engagement with the detents. A compressible support spring is in engagement with the inner column to help balance the weight of the column for assistance in raising it and support in lowering it.

The invention encompasses a tilt-only steering assembly with the special adjustment features described, or an assembly which has both tilt and telescoping features.

Accordingly, in one embodiment a tiltable vehicle steering wheel system of the invention comprises a steering column and means mounting the base of the column at a pivot point on fixed vehicle structure for pivotal movement within a vertical longitudinal plane. An outer slide is fixed to vehicle structure adjacent to the steering column and above the floor of the vehicle. This outer slide has an interior and an exterior, with the interior defining an elongated channel oriented within a vertical longitudinal plane. Positioned slidably within the channel of the outer slide is an inner slide, and slide means are provided between the outer surface of the inner slide and the interior of the outer slide for guiding the inner slide for low-friction linear longitudinal movement within the channel. Means are provided for pivotally securing one end of the inner slide to the steering column, and the path of the inner slide is preferably generally perpendicular to a line between the column base pivot and the pivot connection between the column and the slide. A stop abutment is secured to the outer slide and extends into the channel, within an elongated opening which is provided in the inner slide to limit the travel of the inner slide in both directions. The inner slide has a plurality of position detents arranged in a longitudinal series, and latch means are pivotally connected to the outer slide for engaging selected position detents to select desired positions of steering wheel tilt. The latch means is biased toward engagement with the detents.

In one preferred embodiment of the invention the latch means includes two or more independently movable latches as described above, providing for fine tilt adjustment with relatively wide spacing of the detents. Also, the system preferably further includes means providing for inward and outward telescoping length adjustment of the steering column, with latch means for locking the column in selectable telescoped positions.

In another embodiment a telescoping steering system is provided for enabling direct interchange with a conventional column, the system being simplified in that the steering shaft itself is made to slide longitudinally, as well as rotate, for length adjustment.

It is therefore among the objects of the invention to improve on previous adjustable steering systems by the provision of a relatively simple, efficient structure permitting both telescoping length adjustment and pivoted tilt adjustment. Another object is the provision of a specific slide and guide assembly which moves along with the tilting of the steering column and includes the latching mechanism. A further specific object is to achieve relatively fine tilt adjustment, with the tilt latch mechanism positioned well down the column from the steering wheel, but without the need for closely spaced detents in the latch device. These and other objects, advantages, features and characteristics of the invention will be apparent from the following description of a preferred embodiment, considered along with the accompanying drawings.

DESCRIPTION OF THE DRAWINGS

FIG. 7 is a view similar to FIG. 2, but showing an alternate embodiment which can be used to convert a standard steering column to a telescoping system.

FIG. 8 is a sectional view of the alternate embodiment, taken along the line 8—8 of FIG. 7, showing the telescope latching system.

FIG. 9 is a sectional view of the alternate embodiment, taken along the line 9—9 of FIG. 7, showing a fitting on the column which is connected to the tilt latch mechanism.

DESCRIPTION OF SOME PREFERRED EMBODIMENTS

Figure 1:
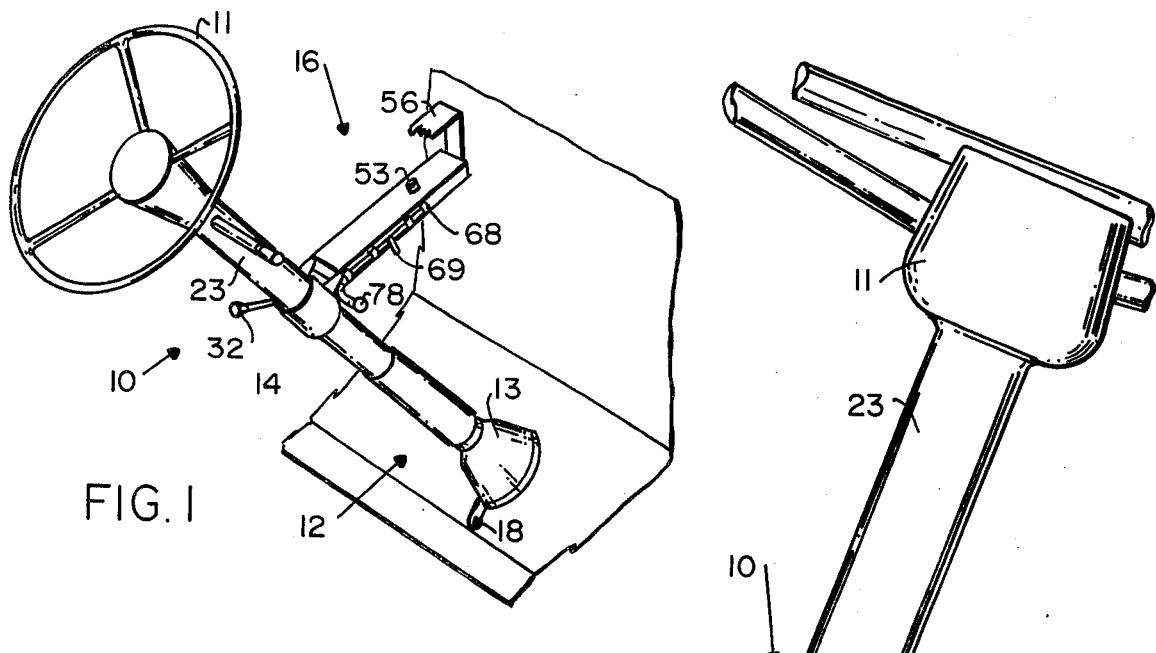
FIG 1 is a right side perspective view showing an adjustable steering assembly according to the invention.

In the drawings, FIG. 1 shows a steering assembly indicated generally by the reference number 10. The assembly includes a steering wheel 11, a steering column indicated generally at 12, a steering bell 13 at the base of the column, a length adjustment and latching mechanism indicated generally at 14, and a tilt adjustment latching mechanism indicated generally at 16.

Figure 2:
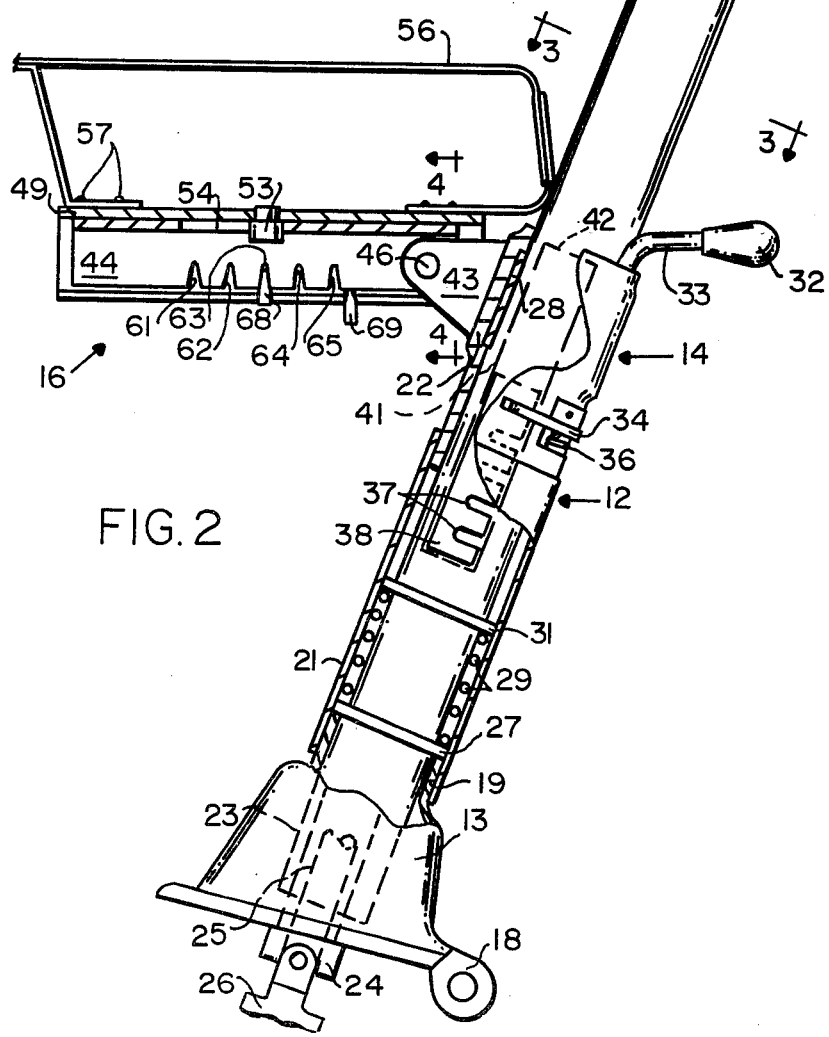
FIG. 2 is a left side elevation view, partially broken and in section, showing tilt and telescoping steering adjustment mechanism of the invention.

As indicated in FIGS. 1 and 2, the steering bell 13 at the base of the column is secured to the floor 17 or other vehicle structure by a pivot connection 18. It should be understood that although the steering column 12 is shown in an upright-angled position, only about 20° or 25° from vertical, as would be typical in a truck cab, the assembly of the invention is applicable and advantageous in any steerable vehicle, and the invention encompasses any orientation of the steering column. Thus, the column 12 may be closer to horizontal, as in a typical automobile.

As FIG. 2 shows, the steering bell 13 is formed into a collar 19 at its upper end so that the outer column 21 can be slipped over it and secured to the bell. This in turn extends up to the telescope latching assembly 14, including a latch housing member 22, which is fixed to the outer column 21. An inner column 23, rotatably supporting an internal steering shaft 25 fixed to the steering wheel 11, is slidable within the outer column 21 and housing member 22, to provide the telescoping adjustment feature. At the end opposite to the steering wheel, the steering shaft 25 is attached by a rotating joint 24 to a conventionally splined intermediate shaft 26, leading to the wheel steering mechanism of the vehicle which is not illustrated in these drawings.

For guiding the inner column 23 in its range of sliding movement, there may be included a polyurethane guide 27, annular in shape, positioned at the top of the collar 19 of the steering bell 13 and within the outer column 21 as shown. Another polyurethane guide 28 may be positioned at a high location, seated within a recess of the housing member 22, as indicated.

There also may be included within the outer column a compression spring 29 for counterbalancing some of the weight of the steering wheel 21 and the inner column 23. A spring is compressed between the surface of the lower polyurethane guide 27 (or other appropriate structure fixed relative to the outer column 21) and a spring stop 31 attached to the inner column.

The telescope latching assembly 14 includes a manual latch handle 32 for releasing the latch device while the desired position of length adjustment is selected. A handle 32 leads to a latch rod 33 which is pivotal within the latching assembly 14 and to which is secured a latch 34. The rod 33 and latch 34 are biased preferably by a torsion spring 36 toward engagement with any of a series of detents 37 formed in a detent block 38 fixed to the inner column 23, five detents 37 being illustrated in FIG. 2, for five separate length adjustment positions. Each of the detents 37 preferably is tapered, and the latch 34 is tapered complementarily in the typical manner, so that a positive-position, rattle-free lock is obtained in each position. The swingable latch 34 is visible at the exterior of the steering column, it being operable through a slot 39 in the housing 22, which opens to the interior of the housing.

The detent block 38 moves up and down with the inner column 23, within the housing 22 and the lower outer column 21. An appropriate channel 41 is formed within these outer members to facilitate the sliding movement of the detent block and to prevent rotating of the column 23. For limiting upward travel of the steering wheel and inner column 23, the channel 41 (dashed lines in FIG. 2) terminates at an upper end 42, which is engaged by the top of the detent block 38 to limit travel in the upper direction. The support spring 29 is designed to limit downward travel to avoid binding the connecting joint 24.

Figure 3:
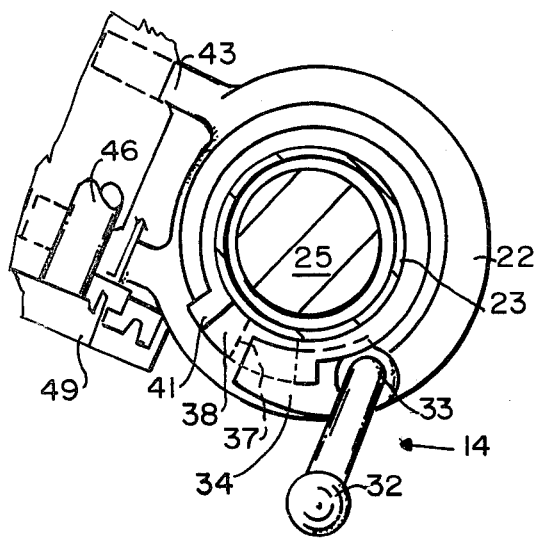
FIG. 3 is a sectional view taken through the steering column, along the line 3—3 of FIG. 2

The sectional view of FIG. 3 shows some of the components of the telescoping adjustment assembly, including the telescope latch handle 32 and pivotal rod 33, the swingable latch 34, the detent block 38 secured to the inner column 23, the steering shaft 25 rotatable within the inner column 23, and the channel 41 formed in the column housing 22 for the detent block's movement.

Figure 4:
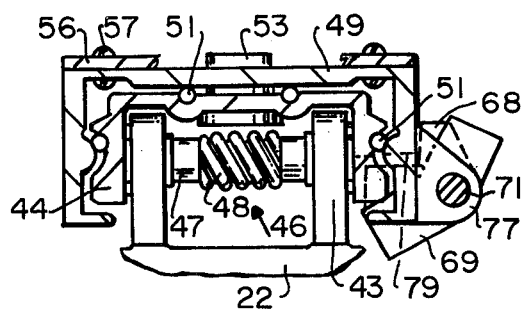
FIG. 4 is a sectional view looking forward in the vehicle showing the tilt latching mechanism, taken along the line 4—4 of FIG. 2.
Figure 5:
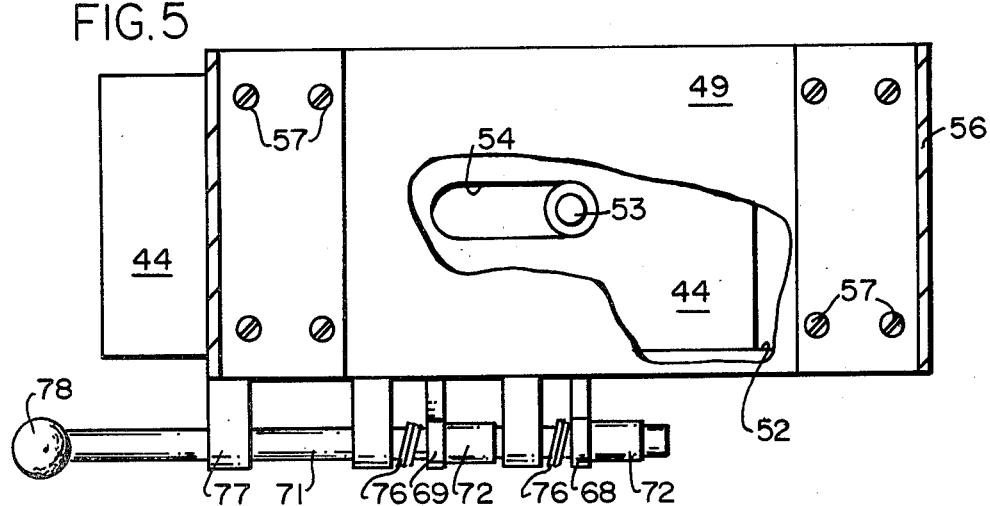
FIG. 5 is a partially broken away plan view of the tilt latching mechanism showing the operation of a stop which limits the tilt travel of the steering column.

The tilt adjustment mechanism 16 is shown in FIGS. 2 through 6. As seen in FIGS. 2, 3 and 4, a pair of flanges 43 extend forwardly from the housing section 22 of the steering column assembly. These flanges 43 are pivotally attached to an inner slide 44 as shown in FIG. 4, and the connection may be made by a single connecting pin 46, as shown in FIG. 4. The connecting pin 46, for example, may have two inwardly movable ends 47, each connecting a respective flange 43 to the inner slide 44, with compression spring 48 normally holding the ends 47 apart and in connecting engagement with the flanges and slide. The purpose of this design is to allow for easy separation between the steering column and the tilt latch machanism 16 so that the column can be rotated abiut the point 18 to provide access to the instrument panel when necessary. Such an arrangement is shown generally in U.S. Pat. No. 4,114,719, assigned to the same assignee as the present invention. Other suitable arrangements may be used in lieu of this illustrated connecting means.

The inner slide 44 is preferably of a strong metal, and it may be cast or its basic cross section extruded. It slides within an outer slide 49, which may be of extruded aluminium, and some form of low-friction sliding arrangement such as the four polyurethane rods 51 shown in FIG. 4 preferably is positioned between the outer surface of the inner slide 44 and the interior surface of the outer slide 49.

The outer slide 49 forms an interior channel 52 within which the inner slide is linearly movable in a relatively short range of travel, which may be about 36 mm. Travel is limited by a stop member 53, shown in FIGS. 2, 4 and 5, which may simply comprise a bolt screwed into the outer slide 49 and extending into an elongated slot 54 in the adjacent upper wall of the inner slide 44.

The outer slide 49 is secured to vehicle structure 56. This may be accomplished by clinch type or threaded fasteners 57. When the steering wheel 11 and column are tilted about the pivot point 18 shown in FIG. 2, the movement of the flanges 43 is followed by linear movement of the inner slide 44. The orientation of the inner and outer slides, i.e. the linear path of travel defined by them, preferably is generally perpendicular to the orientation of the steering column, so that the arc of movement of the steering column is not greatly divergent from the linear travel of the inner slide 44. An imaginary line from the pivot point 18 to the pivot point 46 desirably should be generally perpendicular to the path of travel of the inner slide within the outer slide. The term "generally perpendicular" is intended to include some degree of variance from perpendicularity, as illustrated in FIG. 2. Of course, the more divergence from perpendicular, the greater the tendency of the tilt system to "lock up" when moved beyond small increments. Therefore, the attachments to the vehicle structure 56 are flexibly configured to allow for the minimal rise and fall of the pin 46 as the column 10 is adjusted in the tilt mode, but still maintain rigid alignment of the tilt latch mechanism 16. Alternatively, and especially if the relationship between the pivotal column and the linear slide assembly 44, 49 is not close to perpendicularity, the housing section 22 could be made slidable with respect to the outer column 23.

The tilt latch mechanism 16 includes an important feature whereby a series of detents 61, 62, 63, 64 and 65 formed in the right bottom edge of the inner slide as illustrated in the figures, may be positioned at relatively wide spacing, but yet with the possibility of quite fine adjustment to the tilt of the steering column. This assures that there will be adequate structure 60 between adjacent detents, so that the latching system is adequately strong and rigid in service. This goal is achieved through the use of more than one latch for engaging in the detents 61 through 65. Independently movable latches 68 and 69 alternately are engaged in detents, i.e. only one latch is engaged in a detent at any one time. When one latch is engaged, such as the latch 68 shown in FIG. 2, the outer latch 69 is between detents or to the side of the last detent, as indicated. If two latches are provided, as illustrated herein, the spacing between the latches 68 and 69, which always must be different from the spacing between detents, should be an integral number of detent spacings plus one-half detent spacing apart (conceivably though not in the preferred embodiment, the integral number could be zero). Thus, in FIGS. 2 and 6 there is illustrated a two-latch system wherein the detents are equally spaced and the latches are two and one-half detent spacings apart. This gives tilt adjustment increments, in terms of inner slide movement, equal to one-half the distance between adjacent detents.

If three latches were employed (not illustrated) the spacing between adjacent latches could be one and one-third detent spacings, or two and one-third detent spacings. This would give small tilt adjustments which are separated, in terms of inner slide movement, by one-third the distance between detents.

It should be noted that the principal requirement of the spacing between latches is that it must not be equal to the spacing between any two of the detents. It need not be, in the case of two latches, an integral number of detent spacings plus one-half; however, such spacing is required if the available tilt positions are to be spaced by generally equal increments.

Figure 6:
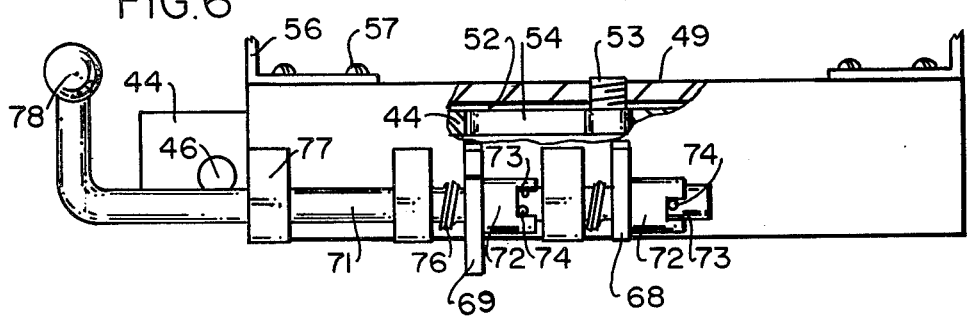
FIG. 6 is a right side elevation view showing a portion of the tilt latching mechanism of the invention.

FIGS. 4 and 6 show preferred structure for releasing and engaging of the two latches 68 and 69. Each latch 68 or 69 is independently rotatably mounted on a tilt latch rod 71. Each has secured to it a sleeve 72 with a notch 73, there being a pin 74 fixed to the rod 71 and positioned in the notch. This limits rotational travel of each latch to a range of motion sufficient to fully enter a detent or to be outside the detents as the latch 69 is illustrated in FIGS. 2, 4 and 6. Each latch is individually spring-biased toward the position of detent engagement, preferably by torsion springs 76. Mounting blocks 77 with internal bearings rotatably support the tilt latching rod 71 on the outer slide 49 or other vehicle structure. There is provided a latch handle 78 at the rearward end of the latch rod 71, for manual retraction of all latches and release of the active latch from a detent. Manual movement of the handle 78, rotating the rod 71, is effective to move both pins 74 in an upward direction as viewed in FIG. 6, so that the active latch 68 is first retracted from the detent, then the pin 74 at the inactive latch 69 contacts the upper edge of its notch 73, and the steering column is shifted to a new desired position of tilt. When the adjustment handle 78 is released, the latches 68 and 69 are again urged toward the detents by the torsion springs 76, since the springs are fixed to the mounting blocks 77 rather than to the rod 71 itself. Thus, the active latch in the new position is urged into the appropriate detent, and this pivots the handle 78 back to the original position.

The latches 68 and 69 act through slots 79 in the lower and side edge of the outer slide, as illustrated in FIGS. 2 and 4, to reach the lower right edge of the inner slide 44 where the detents 61 through 65 are located.

As can be envisioned from FIG. 2, a sequence of six closely-spaced tilt positions is theoretically possible utilizing the five detents and two latches of this preferred embodiment. This would include three positions wherein the latch 68 is in a detent—one of the detents 63, 62 or 61, and three positions wherein the latch 69 is in a detent—one of the detents 65, 64 or 63, alternating with the other three positions as the inner slide progresses to the right as viewed in FIG. 2. In FIG. 2 the steering column is shown at its forwardmost tilt position, with the inner slide 44 abutting against the stop 53. From this point, the inner slide progresses rearwardly (to the right in FIG. 2), as tilt adjustments are progressively made rearwardly. It may be preferred to limit the tilt adjustment to five positions, and the length of the elongated slot 54 shown in these drawings is such as to permit five positions of adjustment. I.e., the second latch 69 cannot be engaged in the detent 63, due to limitation of travel by the slot 54 and stop 53.

FIGS. 7, 8 and 9 show another embodiment of the invention wherein telescoping column components can be fitted into the steering system of a standard truck in place of the fixed, non-length-adjustable column. Rather than sliding a pre-assembled inner column and shaft assembly within another, outer column as in the previously described embodiment, this embodiment reduces weight and size by facilitating the sliding of the rotating steering shaft within the column, eliminating the need for one support column.

In this embodiment a steering column assembly 80 includes a single outer column 81 rigidly secured to a steering bell 13, and a latch cage 82 positioned somewhere on the column 81 within the driver's reach. As in the first embodiment, the steering bell 13, and the entire column, are pivotal about a pivot point 18 secured to the floor or other vehicle structure.

The steering bell 13 may include a split collar clamp 85 at its top, for securing to the base of the column 81.

A clamp assembly 83, consisting of two halves 84 and 86, is secured around the exterior of the column 81, and has a pair of flanges 43 as in the previous embodiment, for connection to the inner slide 44 via a connecting pin 46. This assembly may include a rubber vibration isolator 87, as also indicated in FIG. 9, and the clamp may be held together by a pivot pin 88 (FIG. 9) at one side and a bolt 89 at the other side. This enables the tilt assembly of the invention to be fitted onto a steering column which does not have all of the structure shown in FIG. 2.

Inside the steering column 81 is a steering shaft 91, rotatable for operating the vehicle's steering. The shaft 91 is also made slidable with respect to the column 81 in this embodiment of the invention, with the provision of a rotating joint 24 at the base of the shaft 91, connected to a conventionally splined intermediate shaft 26, as in the first embodiment. The shaft 91 is supported at the extreme ends of the column assembly by bearings 92.

The latch cage 82 is shown in section in FIG. 8. Inside the column 81, there is provided a latching spool 93 which is restricted from up/down sliding on the shaft 91 by snap rings 94 on the shaft, but free to rotate. The spool 93 has a series of circumferential grooves 96 for selective engagement by a latch 97 which pivots at a pin 98 secured to the body of the latch cage 82. At the other end of the latch device is a compression spring 99 for urging the latch 97 toward the grooves or detents 96 of the spool. A latch handle 100 is provided for engaging and disengaging the latch from the grooves or detents. An appropriately sized opening 101 is provided in the steering column 81 for the latch 97 and its movement, and the latch cage 82 is secured to the exterior of the column 81 by appropriate securing means.

Up/down travel of the steering wheel 11 and steering shaft 91 is limited by the steering wheel's contacting the column 81 at the lower end of movement, and by the contact of the rotating joint 24 with the lower end of the column at the upper limit of movement.

In a further variation of the telescoping steering arrangement of the invention, the embodiment just described may include a steering shaft 91 comprised of two separate sections within the column 81, splined together for telescoping movement of the upper section with respect to the lower section (not shown). With this arrangement, the intermediate shaft 26 need not be splined.

There is a high degree of cooperation among the various components and functional aspects of the tilt and telescoping steering assembly 10 of this invention. The inner and outer slide assembly of the tilt adjustment system not only provides for tilt adjustment, but also establishes the limits of tilt travel of the steering column, through the slot and stop arrangement, and provides a guide for tilting movement of the column. Also the steering column housing component 22, which is shiftable up and down with respect to the lower outer column 21 and the inner column 23, both provides a guide surface 28 for height adjustment of the inner column 23 and also accomodates the apparent rise and fall dictated by the arcuate movement of the steering column and the inner slide connection point 46 with respect to the linear travel of the inner slide 44, as discussed above. Other features are also highly efficient and result in an assembly which is relatively simple but yet provides distinct advantages over systems diclosed in the prior art.

The preferred embodiment described herein is intended to be purely illustrative, and not limiting of the scope of the invention. Other embodiments and variations will be apparent to those skilled in the art and may be made without departing from the essence and scope of the invention as defined in the following claims.

I claim:

1. In a tilt steering wheel system for a vehicle including a steering column connected pivotally to vehicle structure for pivotal movement within a vertical longitudinal plane, an improved latching mechanism comprising:

a detent component connected to and movable with the steering column, including a plurality of position detents in one edge, arranged in a series:

at least two latches positioned adjacent to the series of detents and means mounting the latches for movement toward and away from the detents, each latch being shaped for engagement in the detents;

spring means urging each latch in the direction of engagement with the detents; and release means connected to vehicle structure and associated with the latches for retracting all latches when moved toward an unlatching position;

the spacing between adjacent latches being different from the spacing between adjacent detents, so that only one latch enters a detent at a time, whereby as the steering column is moved through its range of tilt, alternating ones of the latches engage in detents, and the selectable tilt positions of the column are more closely spaced than the detents.

2. The improvement of claim 1, wherein the release means comprises a pivotal rod connected to vehicle structure and pivotal about a longitudinal axis, with a handle for manual operation by a driver and including means for engaging the latches to move them toward the unlatching position upon operation of the pivotal rod.

3. The improvement of claim 2, wherein each latch is mounted on the rod for pivotal movement with respect to the rod.

4. A tilt steering wheel system for a vehicle, comprising:

a steering column and means mounting the base of the column on fixed vehicle structure for pivotal movement with a vertical longitudinal plane;

an outer slide having an interior and an exterior and being fixed to vehicle structure adjacent to the steering column and above the floor of the vehicle, the interior of the outer slide defining an elongated channel oriented within a vertical longitudinal plane;

an inner slide positioned slidably within the channel of the outer slide, with slide means between the outer surface of the inner slide and the interior of the outer slide for guiding the inner slide for low-friction linear longitudinal movement within the channel;

means pivotally securing one end of the inner slide to the steering column about a horizontal pivot axis;

a stop abutment secured to the outer slide and extending into the channel, an elogated opening being provided in the inner slide with the stop abutment extending into the elongated opening to limit the travel of the inner slide in both directions;

a plurality of position detents formed in the inner slide and arranged in a longitudinal series; and a pivoted actuating rod connected to the outer slide, a pivot handle secured to the rod, at least two latches pivotally movable on the rod, each shaped for engagement in the detents, spring means urging each latch in the direction of engagement with the detents, and means associated with the rod and the latches for retracting all latches when the pivot handle and rod are pivoted toward an unlatching position, the spacing between adjacent latches being different from the spacing between adjacent detents so that only one latch enters a detent at a time, whereby as the steering column is moved through its range of tilt, alternating ones of the latches engage in detents and the selectable tilt positions of the column are more closely spaced than the detents.

5. The tilt steering wheel system of claim 4, wherein the latch retracting means comprises a notch in each latch adjacent to the actuating rod, and a pin at each latch fixed to the rod and positioned within the notch, permitting individual pivotal movement of each latch within the range of motion defined by the notch and pin, the range being wide enough to permit one latch to be fully engaged in a detent at the same time others are displaced from the detents, pivoting of the actuating rod toward the unlatching position being effective to retract the one engaged latch from the detent and then to retract all the latches away from the inner slide, so that the steering wheel tilt can be adjusted by movement of the inner slide relative to the latches until a new tilt position is selected.

6. In a tilt steering wheel system for a vehicle including a steering column connected pivotally to vehicle structure for pivotal movement within a vertical longitudinal plane, an improved latching mechanism comprising:

a detent component connected to and movable with the steering column, including a plurality of position detents in one edge, arranged in a series;

a pivoted actuation rod connected to vehicle structure, with a pivot handle secured to the rod and inclining at least two latches positioned adjacent to the series of detents and pivotally movable on the rod, each latch shaped for engagement in the detents:

spring means urging each latch in the direction of engagement with the detents; and means associated with the rod and the latches for retracting all latches when the pivot handle and rod are pivoted toward an unlatching position;

the spacing between adjacent latches being different from the spacing between adjacent detents, so that only one latch enters a detent at a time, whereby as the steering column is moved through its range of tilt, alternating ones of the latches engage in detents, and the selectable tilt positions of the column are more closely spaced than the detents.

7. The improvement of claim 6, wherein the latch retracting means comprises a notch in each latch adjacent to the actuating rod, and a pin at each latch fixed to the rod and positioned within the notch, permitting individual pivotal movement of each latch within the range of motion defined by the notch and pin, the range being wide enough to permit one latch to be fully engaged in a detent at the same time others are displaced from the detents, pivoting of the actuating rod toward the unlatching position being effective to retract the one engaged latch from the detent and then to retract all the latches away from the detent component, so that the steering wheel tilt can be adjusted by movement of the detent component relative to the latches until a new tilt position is selected.

8. The improvement of claim 6, wherein the detents are equally spaced in the series, and wherein two latches are provided, spaced apart by a distance equal to an integral number of detent spaces plus one-half detent space.

9. The improvement of claim 6, wherein the detent component comprises an elongated slide member having one end pivotally connected to the steering column, and means fixed to vehicle structure for guiding the slide member in linear longitudinal movement within a vertical plane oriented longitudinally with respect to the vehicle.

10. The improvement of claim 6, further including a stop means secured to vehicle structure, and an elongated opening on the detent component, with the stop means positioned within the opening, for limiting travel of the detent component in both directions.

* * * * *

UNITED STATES PATENT AND TRADEMARK OFFICE
CERTIFICATE OF CORRECTION

PATENT NO. : 4,424,721
DATED : January 10, 1984
INVENTOR(S) : David W. Deacon

It is certified that error appears in the above-identified patent and that said Letters Patent are hereby corrected as shown below:

Column 4, line 33, "high" should read --higher--.

Column 6, line 12, "60" should read --66--.

Column 9, line 27, "with" should read --within--.

Column 10, line 21, "inclining" should read --including--.

Signed and Sealed this

Eighth Day of May 1984

[SEAL]

Attest:

GERALD J. MOSSINGHOFF

Attesting Officer

Commissioner of Patents and Trademarks